(12) United States Patent
Rolf

(10) Patent No.: US 7,788,174 B1
(45) Date of Patent: Aug. 31, 2010

(54) METHOD FOR FACILITATING A VALUE EXCHANGE IN A MOBILE PAYMENTS NETWORK

(75) Inventor: Devon A. Rolf, Paola, KS (US)

(73) Assignee: GoFigure Payments, LLC, Paola, KS (US)

( * ) Notice: Subject to any disclaimer, the term of this patent is extended or adjusted under 35 U.S.C. 154(b) by 80 days.

(21) Appl. No.: 11/485,700

(22) Filed: Jul. 13, 2006

(51) Int. Cl.
*G06Q 40/00* (2006.01)

(52) U.S. Cl. .............................. 705/39; 705/26; 705/35; 705/40; 705/42; 705/44; 705/64

(58) Field of Classification Search .................... 705/35
See application file for complete search history.

(56) References Cited

U.S. PATENT DOCUMENTS

| | | | |
|---|---|---|---|
| 5,806,045 | A | 9/1998 | Biorge et al. |
| 5,870,722 | A | 2/1999 | Albert et al. |
| 5,987,429 | A | 11/1999 | Maritzen et al. |
| 5,992,738 | A | 11/1999 | Matsumoto et al. |
| 6,038,552 | A | 3/2000 | Fleischl et al. |
| 6,098,053 | A | 8/2000 | Slater |
| 6,119,106 | A | 9/2000 | Mersky et al. |
| 6,233,568 | B1 * | 5/2001 | Kara .......................... 705/410 |
| 6,347,305 | B1 | 2/2002 | Watkins |
| 6,829,588 | B1 | 12/2004 | Stoutenberg et al. |
| 6,868,391 | B1 | 3/2005 | Hultgreen |
| 6,876,979 | B2 | 4/2005 | Ling |
| 7,089,208 | B1 | 8/2006 | Levchin et al. |
| 7,376,583 | B1 | 5/2008 | Rolf |
| 2001/0011239 | A1 * | 8/2001 | Kondoh et al. ................. 705/27 |
| 2001/0016835 | A1 | 8/2001 | Hansmann et al. |
| 2002/0152160 | A1 | 10/2002 | Allen-Rouman et al. |
| 2002/0152168 | A1 | 10/2002 | Neofytides et al. |
| 2003/0004868 | A1 | 1/2003 | Early et al. |
| 2003/0139999 | A1 | 7/2003 | Rowe |
| 2003/0144942 | A1 * | 7/2003 | Sobek .......................... 705/36 |
| 2004/0033797 | A1 | 2/2004 | Ravisto et al. |
| 2004/0039694 | A1 | 2/2004 | Dunn et al. |
| 2004/0111361 | A1 | 6/2004 | Griffiths et al. |
| 2004/0111370 | A1 | 6/2004 | Saylors et al. |
| 2004/0225545 | A1 | 11/2004 | Turner et al. |
| 2005/0027700 | A1 | 2/2005 | Turner et al. |

(Continued)

OTHER PUBLICATIONS

Amendment dated Nov. 13, 2008, as filed in response to the non-final Office Action dated May 13, 2008, in U.S. Appl. No. 11/485,719, filed Jul. 13, 2006; Applicant: Rolf, Devon A.

(Continued)

*Primary Examiner*—Kambiz Abdi
*Assistant Examiner*—Elizabeth H Rosen
(74) *Attorney, Agent, or Firm*—Hovey Williams LLP

(57) ABSTRACT

A system and method for electronically processing and settling electronic financial transactions in an environment in which a number of different service providers provide financial services in addition to their core communications, content aggregation, media or Internet search, advertising and/or auction services. More specifically, the present invention concerns an electronic financial gateway and/or middleware processing of financial transactions in an environment in which a plurality of communications, media, or Internet service providers provide also financial services to their customers. The financial transactions are settled to existing accounts associated with the service providers.

20 Claims, 2 Drawing Sheets

U.S. PATENT DOCUMENTS

| | | | |
|---|---|---|---|
| 2005/0033691 | A1 | 2/2005 | Whewell et al. |
| 2005/0037731 | A1 | 2/2005 | Whewell et al. |
| 2005/0044018 | A1 | 2/2005 | Whewell |
| 2005/0149416 | A1 | 7/2005 | Benco et al. |
| 2005/0256802 | A1 | 11/2005 | Ammermann et al. |
| 2006/0026099 | A1 | 2/2006 | Danz et al. |
| 2006/0129504 | A1 | 6/2006 | Nakajima |
| 2006/0212393 | A1 | 9/2006 | Lindsay-Brown |
| 2006/0224477 | A1 | 10/2006 | Garcia et al. |
| 2006/0248015 | A1 | 11/2006 | Baartmman et al. |
| 2006/0289621 | A1* | 12/2006 | Foss et al. ............ 235/375 |
| 2006/0294025 | A1* | 12/2006 | Mengerink ............ 705/77 |
| 2007/0022214 | A1* | 1/2007 | Harcourt ............ 709/246 |
| 2007/0156579 | A1* | 7/2007 | Manesh ............ 705/39 |
| 2007/0287413 | A1 | 12/2007 | Kleitsch et al. |
| 2008/0010190 | A1 | 1/2008 | Rackley, III et al. |
| 2008/0195498 | A1 | 8/2008 | Crawford et al. |

OTHER PUBLICATIONS

Final Office Action dated Feb. 3, 2009, in U.S. Appl. No. 11/485,719, filed Jul. 13, 2006; Applicant: Rolf, Devon A.

Amendment dated May 4, 2009, as filed in response to the final Office Action dated Feb. 3, 2009, in U.S. Appl. No. 11/485,719, filed Jul. 13, 2006; Applicant: Rolf, Devon A.

Non-Final Office Action dated Jun. 24, 2009, in U.S. Appl. No. 11/485,719, filed Jul. 13, 2006; Applicant: Rolf, Devon A.

Amendment and Interview Summary dated Sep. 17, 2009, as filed in response to the non-final Office Action dated Jun. 24, 2009, in U.S. Appl. No. 11/485,719, filed Jul. 13, 2006; Applicant: Rolf, Devon A.

Interview Summary dated Aug. 21, 2009, in U.S. Appl. No. 11/485,719, filed Jul. 13, 2006; Applicant: Rolf, Devon A.

"Why Cingular's Allying with a P-to-P Upstart", Daniel Wolfe. American Banker, New York: N.Y. Jun. 9, 2006. vol. 181, Iss. 110; p. 1.

"Sprint and eONE Global Announce Plans to Create First Interoperable Mobile Payments Network". eONE Global. May 22, 2002 <http://www2.prnewswire.com/cgi-bin/stories.pl?ACCT=104&STORY=/www/story/05-22-...>.

Toward The Single Account; United States Banker, Company/Corporate Profile/Review; Dec. 16, 1974, pp. 5-6.

U.S. Appl. No. 11/485,719, filed Jul. 13, 2006 (spec and claims).

U.S. Appl. No. 11/485,719, Office Action dated May 13, 2008.

* cited by examiner

METHOD FOR FACILITATING A VALUE EXCHANGE IN A MOBILE PAYMENTS NETWORK

BACKGROUND OF THE INVENTION

1. Field of the Invention

The present invention relates broadly to systems and methods for processing electronic transactions. In particular, the present invention concerns a system and method for processing and settling electronic financial transactions which are accounted to an account of an account holder making the transaction, wherein the account is associated with a voice and/or data communications service, electronic content aggregation service, and/or media service.

2. Description of the Prior Art

Systems and method for making electronic financial transactions via a wireless communications link are known. In one such prior art system and method, an electronic financial transaction may be initiated with an electronic communications device, such as a telephone, a wireless telephone, or a personal digital assistant. Depending on the particular implementation, the device may store data indicative of the unit in an internal memory for transmission to a point-of-sale terminal, where that information is used to make a transaction; or the device may transmit an instruction to a remote server for retrieval of the data indicative of the unit for making an electronic transaction; or the device may store data indicative of a debit or credit account number in an internal memory; or the device may send an instruction to a remote server for retrieval of the debit or credit card information.

In another prior art system and method, an account associated with a service corresponding to the device, such as a voice and/or data communications service, may also serve as a debit or credit account such that the transaction may be accounted for (or billed directly to) the account associated with the service corresponding to the device.

It will be appreciated that there are a wide variety of communications companies, digital content aggregation companies, media companies, and providers of Internet search, advertising and/or auction features and/or Internet access that may wish to make use of such technology in a variety of wireless and non-wireless environments. Accordingly, a need exists for provision of such systems and methods in an environment in which a wide variety of separate organizations offer such systems and methods to their customers. In particular, a need exists for a system and method for electronically processing and settling financial transactions made by customers of a wide variety of different service providers.

SUMMARY OF THE INVENTION

The present provides a system and method for electronically processing and settling electronic financial transactions in an environment in which a number of different service providers provide financial services in addition to their core communications, content aggregation, and/or media services. More specifically, the present invention concerns an electronic financial gateway and/or middleware processing of financial transactions in an environment in which a plurality of communications, media, or Internet service providers also provide, or provide for, financial services to their customers. The present invention is particularly advantageous in those instances in which such providers or other entities are consolidating the billing of transactions and other services or where the account itself is being utilized as a debit or credit account.

The present invention allows for and facilitates processing and settling electronic financial transactions electronically by one or more processors. In one embodiment, a database memory associated with the processor stores information pertaining to the accounts of a plurality of service providers. The nature of the service provided by each service provider may vary, but it is generally preferred that the type of service providers involved provide voice and/or data communications services, including wired and/or wireless communications, electronic content aggregation services, Internet services such as electronic content aggregation and/or Internet access or portal services and/or Internet search and/or advertising services and/or auction services, or media services (such as cable television, satellite television, and network television).

In an environment in which the service providers provide their customers with the ability to make purchases utilizing the service, possibly via an electronic communications device associated with the service, the present invention serves to process and settle such transactions. More specifically, in accordance with a preferred first embodiment, when an account holder initiates a purchase transaction, initial information pertaining to the account holder is transmitted to the processor. This initial information may include, for example, a unique identifier, such as a telephone number or identification code. The processor receives the initial information and retrieves from memory more detailed information associated with the account holder for the purpose of authorizing the account holder and, ultimately, processing and settling the transaction. The initial information received by the processor does not include information pertaining to the particular service provider involved; accordingly, the more detailed information received by the processor from the memory does include information pertaining to the identity of the service provider associated with the account holder. This information may be utilized, along with other retrieved information (such as account balance or payment information) to determine whether the transaction can be authorized. Additionally, such information may ultimately be used for customer relationship and billing purposes, either by the service provider or by another entity associated with the service provider that provides those functions. In those embodiments of the present invention in which the service provider is utilizing the account of the user as the debit or credit account itself, retrieval of information pertaining to the identity of the service provider is a step critical to assuring processing accuracy and to associating the transaction with the proper account and entity.

In a variation of the present invention, the information initially received by the processor includes information pertaining to the service provider involved, and the processor utilizes that information, along with any additional retrieved information, in authorizing, processing and settling the transaction.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENTS

With reference to the figures, a system 10 and method are herein described, shown, and otherwise disclosed in accordance with the preferred embodiments of the present invention. Broadly, the system 10 and method are adapted and operable to electronically process and settle electronic financial transactions in an environment in which a number of different service providers provide financial services in addition to their core communications, content aggregation, and/or media services. More specifically, the present invention concerns an electronic financial gateway and/or middleware processing of financial transactions in an environment in which a plurality of communications, media, or Internet service providers also provide financial services to their customers. The present invention is particularly advantageous in those instances in which such providers or other entities are consolidating the billing of transactions and other services or where the account itself is being utilized as a debit or credit account.

Figure 1:
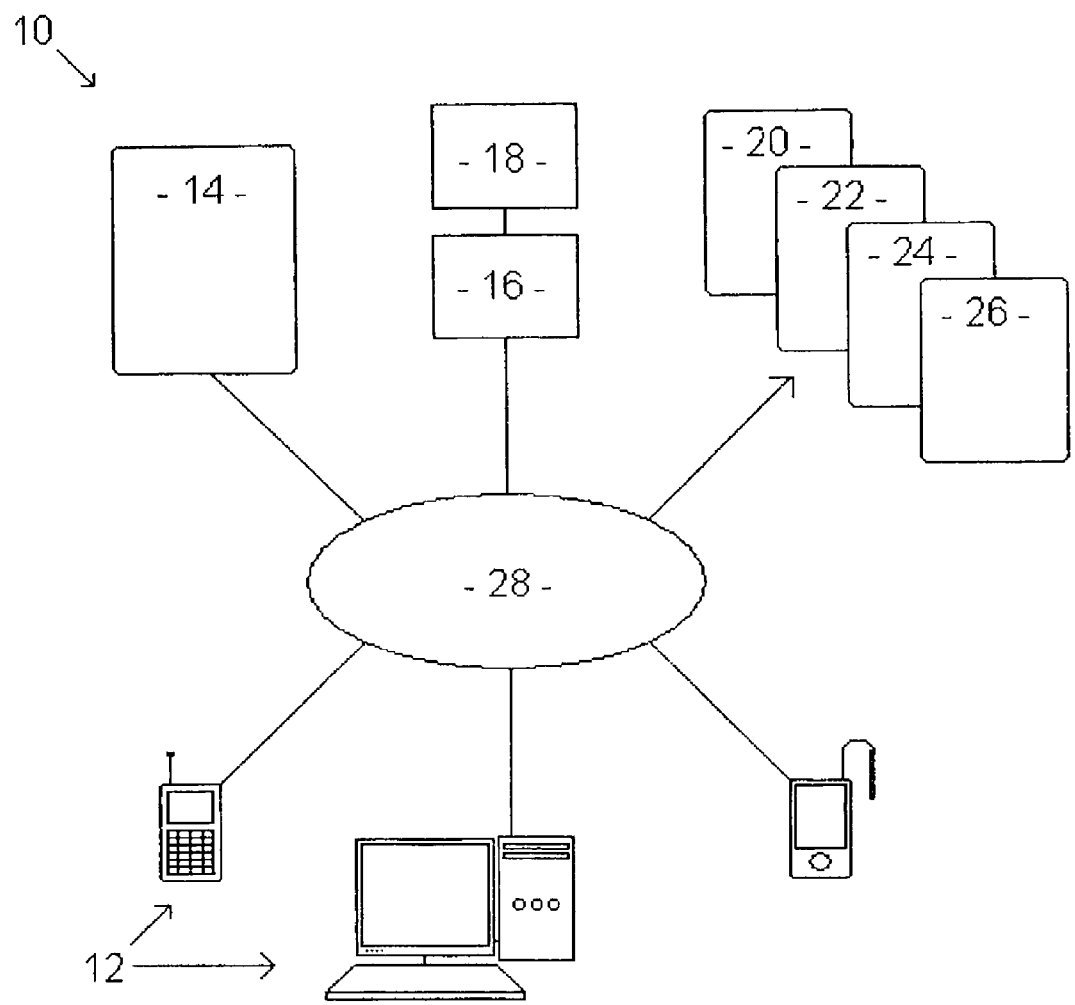
FIG. 1 is a block diagram of a preferred embodiment of the system of the present invention.

Referring to FIG. 1, the system 10 comprises an electronic device 12; a merchant site 14; a processor 16 and an associated memory 18; a plurality of service providers 20, 22, 24, 26; and a communications network 28. The electronic communications device 12 allows a user to initiate an electronic financial transaction. The device 12 may be any of a wide variety of devices using any of a wide variety of technologies, including, for example, a portable wireless voice and/or data communications device, such as a cellular telephone or a wireless personal digital assistant; a portable computer, such as a wirelessly equipped laptop computer; a personal computer; or an interactive television or radio (such as a radio or television that is Internet enabled), a telematics device, or may include more conventional input devices such as a plastic card provided with a magnetic strip or with an embedded transponder or processor, or may even include a biometric element such as a fingerprint or retina scan.

The merchant site 14 is where the financial transaction is initiated. The merchant site 14 may include a point-of-sale terminal, and may be at a physical retail location or may be on a network (such as an Internet site) and therefore located remotely from the device 12.

The processor 16 receives initial information from the device 12 relating to the transaction and, based on the initial information, accesses additional information for the purpose of accomplishing the financial transaction. The processor 16 may be provided in a variety of forms, such as a server located on a network (which is the preferred embodiment), or a plurality of servers or personal computers networked or otherwise cooperating together. Similarly, the associated memory 18 is may be provided in a variety of forms, such as a database memory located locally with the processor 16 (which is the preferred embodiment), or as one or more remotely-located memories connected to the processor 16 by the network 28.

The service providers 20,22,24,26 may provide substantially any service, but it is generally preferred that the type of service providers involved provide voice and/or data communications services, including wired and/or wireless communications, electronic content aggregation services, Internet services such as electronic content aggregation and/or Internet access or portal services and/or Internet search and/or advertising services and/or Internet auction services, or media services (such as cable television, satellite television, and network television). The user of the device 12 is a client or customer of one or more of the service providers 20,22,24, 26, and the service provided may involve use of the device 12. The customer is associated with an account associated with having or using the service, and the account is maintained by or for the service provider.

The communications network 28 allows for and facilitates communication and information exchange between the various parties and entities involved. The network 28 may be the Internet or any LAN, WAN, or other network or combination of networks which use any of a wide variety of communication technologies, including wireless, hard-wired, optical, land line, or short range technologies, including but not limited to Wi-Fi, Wi-Max, BlueTooth and others.

As will be described more fully below and in conjunction with FIG. 2, the processor 16 serves as a financial gateway and functions to authorize, process, and settle the electronic financial transactions made by the account-holding user via the device 12. More specifically, the processor 16 operates to associate the transaction with the appropriate account holder, account, and account-issuing service provider, and processes and settles the transaction in accordance with any retrieved information associated with the account and the service provider. It should be understood and appreciated that part of the processor's function is to determine and identify the particular service provider, whether, e.g., Verizon, Sprint-Nextel, Time-Warner/AOL, Yahoo!, Google, Ebay or another entity in order to properly identify and access the account and to identify any specific transactional or settlement instructions required by the particular service provider.

Figure 2:
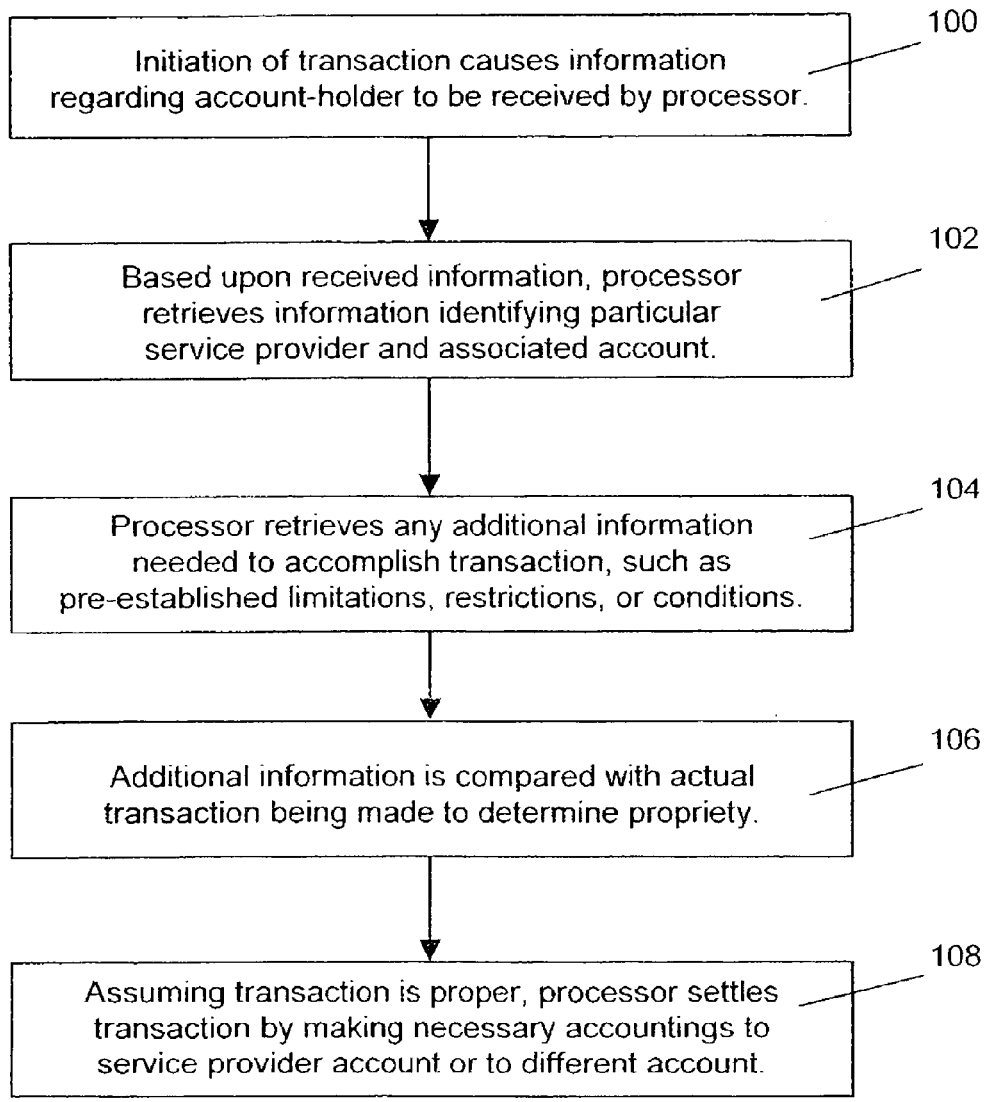
FIG. 2 is a flowchart of steps involved in practicing a preferred embodiment of the method of the present invention.

Referring also to FIG. 2, exemplary use and operation of the system 10 of the present invention proceeds as follows. The user of the device 12 first initiates a purchase or other financial transaction at merchant site 14. Such initiation causes initial information to be transmitted to the processor 16 regarding the account-holding user, as indicated by box 100. The type and nature of this initial information, and the manner in which it is transmitted and received, may vary widely according to the particular implementation details of the present invention. In any event, the information received is unique to and indicative of the account holder. In one contemplated implementation, for example, the information is transmitted from the device 12 or the merchant site 14 (i.e., the point-of-sale terminal) directly to the processor 16. In a contemplated alternative implementation, however, the information is received from a separate processor associated with the service provider corresponding to the account holder and/or device 12. In this latter implementation, initiation of the financial transaction invokes an application which contacts a server associated with the corresponding service provider, and the service provider then transmits the information to processor 16.

Based on the received initial information regarding the account holder, the processor 16 determines the identity of the service provider associated with the account, as indicated by box 102. The manner in which this determination is made may vary according to the particular implementation details of the present invention. In one contemplated implementation, however, the initial information identifying the account holder does not include information identifying the associated service provider. Instead, the processor 16 retrieves from the memory 18 information indicative of the service provider. In an alternative implementation, the initial information received directly from the device 12 may include information about the identity of the corresponding service provider or, alternatively, in those implementations in which information is first transmitted via a server of the service provider, the service provider itself transmits its identity to the processor 16.

The processor 16 then retrieves from the memory 18 any additional information needed to accomplish the transaction, as indicated by box 104. For example, certain service providers may have limitations on the types of transactions or the dollar amounts of the transactions that can be made. This information is compared with the actual transaction being made to determine whether it can be properly authorized, as indicated by box 106.

Assuming the transaction is proper, the processor 16 then settles the transaction by making necessary accountings to the account, as indicated by step 108. It will be understood that the settlement operation may in fact include debiting or crediting the account associated with the service provider, or another account (i.e., a bank account or debit or credit account) held by the user. Settling the transaction may also involve data entries at additional remote locations, such as banking or other financial institutions. Additionally, information indicative of the settled transaction is stored in the memory 18 and may be used for subsequent billing or statement output (whether by the processor 16 or an entity associated therewith, or by an additional processor/entity to which the information from the memory 18 may be transmitted. It will be understood that different providers may have different fee structures and that the present invention accommodates different fee arrangements provided by different providers.

From the foregoing, it will be seen that this invention is one well adapted to attain any and all ends and objects hereinabove set forth together with the other advantages which are obvious and which are inherent.

It will be understood that certain features and subcombinations are of utility and may be employed with reference to other features and subcombinations.

This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A computer-implemented method for facilitating a value exchange, said method comprising:
    having a database memory of accountholder information for a plurality of mobile payment accounts used for making purchases, wherein each said mobile payment account corresponds with an accountholder and is provided by a corresponding one of a plurality of mobile providers, and wherein said database is employed by at least one electronic processor;
    storing in said database memory information indicative of said plurality of mobile providers, wherein said storing in said database memory information indicative of a plurality of mobile providers comprises storing information indicative of an identity of each mobile provider and transactional or settlement requirements of each mobile provider that are used in processing or settling a purchase transaction made with a said mobile payment account associated with its corresponding mobile provider, and wherein each said mobile payment account is associated with a one of said mobile providers and said storing in said database memory information indicative of said plurality of mobile providers including particularly storing information indicative of the identity of each mobile provider and transactional or settlement requirements of each mobile provider employs at least one electronic processor;
    receiving information pertaining to a purchase transaction that is being made with a one of said mobile payment accounts by its corresponding accountholder, wherein said purchase transaction is initiated via a payments device associated with a corresponding one of said mobile providers, and wherein said receiving information pertaining to a purchase transaction further comprises receiving information indicative of the account of the accountholder making said purchase transaction, wherein said received information pertaining to the purchase transaction does not include information that identifies the mobile provider associated with said mobile payment account, wherein said receiving information pertaining to a purchase transaction that is being made with a one of said mobile payment accounts including particularly said receiving information indicative of the accountholder making said purchase transaction is performed by at least one electronic processor;
    using said received information indicative of the mobile payment account of the accountholder making said purchase transaction to initially identify the mobile provider associated with said mobile payment account by retrieving from said database memory information corresponding to said mobile payment account that identifies said mobile provider, wherein said identifying the mobile provider associated with said mobile payment account utilizes at least one electronic processor;
    retrieving from said database memory at least a portion of said requirements of the identified mobile provider for use in determining whether to authorize use of said mobile payment account for which said indicating information was received for said purchase transaction, wherein said retrieving from said database memory at least a portion of said requirements of the identified mobile provider for use in determining whether to authorize use of said mobile payment account for said purchase transaction utilizes at least one electronic processor;
    authorizing said purchase transaction upon determining that said retrieved requirements of the identified mobile provider are met, wherein said authorizing said purchase transaction employs at least one electronic processor; and
    processing a settlement of said purchase transaction, wherein said processing the settlement of said purchase transaction utilizes the mobile payment account, of the accountholder, associated with said mobile provider corresponding to the mobile payment account of the accountholder, and wherein said processing a settlement of the purchase transaction employs at least one electronic processor.

2. The method as set forth in claim 1 wherein said processing a settlement of said purchase transaction further comprises using said settlement requirements established wherein said using said settlement requirements established by said mobile provider in processing said settlement of said purchase transaction employs at least one electronic processor.

3. The method as set forth in claim 2 wherein each of said mobile providers has a corresponding fee structure and wherein a first of the mobile providers has a first fee structure and a second of the mobile providers has a second fee structure that differs from the first fee structure, wherein said processing said settlement of said purchase transaction comprises taking into account the said fee structure of said mobile provider corresponding to the mobile payment account being used to make said purchase transaction, wherein said taking into account the said fee structure of said mobile provider corresponding to the mobile payment account being used to make said purchase transaction employs at least one electronic processor.

4. The method as set forth in claim 1 wherein said purchase transaction is initiated at a point of sale terminal at a physical retail location with a payments device that comprises a mobile wireless communications device.

5. The method as set forth in claim 1 wherein said purchase transaction is initiated at a point of sale terminal at a physical retail location with a payments device that comprises a payment card.

6. The method as set forth in claim 1 wherein said purchase transaction is initiated with a payments device that comprises a personal computer.

7. The method as set forth in claim 1 wherein said purchase transaction is initiated with a payments device that comprises an interactive television.

8. The method as set forth in claim 1 further comprising:
enabling said payment account for use on a mobile wireless communications device of the accountholder to enable said purchase transaction to be initiated with said payment account via said mobile wireless communications device; and
providing a payment card to the accountholder to enable said purchase transaction to be initiated with said payment account via said payment card.

9. The method as set forth in claim 1 wherein said payment account comprises a debit account.

10. The method as set forth in claim 1 wherein said payment account comprises a credit account.

11. The method as set forth in claim 1 wherein said mobile provider comprises a provider of mobile wireless services.

12. A computer-implemented method for facilitating a value exchange, said method comprising:
having a database memory of accountholder information for a plurality of mobile payment accounts used for making purchases, wherein each said mobile payment account corresponds with an accountholder and is provided by a corresponding one of a plurality of mobile providers, and wherein said database is employed by at least one electronic processor;
storing in said database memory information indicative of said plurality of mobile providers, wherein said storing in said database memory information indicative of a plurality of mobile providers comprises storing information indicative of an identity of each mobile provider and transactional or settlement requirements of each mobile provider that are used in processing or settling a purchase transaction made with a said mobile payment account associated with its corresponding mobile provider, and wherein each said mobile payment account is associated with a one of said mobile providers and said storing in said database memory information indicative of said plurality of mobile providers including particularly storing information indicative of the identity of each mobile provider and transactional or settlement requirements of each mobile provider employs at least one electronic processor;
receiving information pertaining to a purchase transaction that is being made with a one of said mobile payment accounts by its corresponding accountholder, wherein said purchase transaction is initiated via a payments device associated with a corresponding one of said mobile providers, and wherein said receiving information pertaining to a purchase transaction further comprises receiving information indicative of the account of the accountholder making said purchase transaction, wherein said received information pertaining to the purchase transaction does not include information that identifies the mobile provider associated with said mobile payment account, wherein said receiving information pertaining to a purchase transaction that is being made with a one of said mobile payment accounts including particularly said receiving information indicative of the accountholder making said purchase transaction is performed by at least one electronic processor;
using said received information indicative of the mobile payment account of the accountholder making said purchase transaction to initially identify the mobile provider associated with portion of said requirements of the identified mobile provider for use in determining whether to authorize use of said mobile payment account for which said indicating information was received for said purchase transaction, wherein said identifying the mobile provider associated with said mobile payment account and retrieving from said database memory at least a portion of said requirements of the identified mobile provider for use in determining whether to authorize use of said mobile payment account for said purchase transaction utilizes at least one electronic processor;
authorizing said purchase transaction upon determining that said retrieved requirements of the identified mobile provider are met, wherein said authorizing said purchase transaction employs at least one electronic processor; and
processing a settlement of said purchase transaction, wherein said processing the settlement of said purchase transaction utilizes the mobile payment account, of the accountholder, associated with said mobile provider corresponding to the mobile payment account of the accountholder, wherein each of said mobile providers has a corresponding fee structure and wherein a first of the mobile communications service providers has a first fee structure and a second of the mobile communications service providers has a second fee structure that differs from the first fee structure, wherein said processing said settlement of said purchase transaction comprises taking into account the said fee structure of said mobile provider corresponding to the mobile payment account being used to make said purchase transaction, and wherein said processing a settlement of the purchase transaction employs at least one electronic processor.

13. The method as set forth in claim 12 wherein said purchase transaction is initiated at a point of sale terminal at a physical retail location with a payments device that comprises a mobile wireless communications device.

14. The method as set forth in claim 12 wherein said purchase transaction is initiated at a point of sale terminal at a physical retail location with a payments device that comprises a payment card.

15. The method as set forth in claim 12 wherein said purchase transaction is initiated with a payments device that comprises a personal computer.

16. The method as set forth in claim 12 wherein said purchase transaction is initiated with a payments device that comprises an interactive television.

17. The method as set forth in claim 12 further comprising:
enabling said payment account for use on a mobile wireless communications device of the accountholder to enable said purchase transaction to be initiated with said payment account via said mobile wireless communications device; and providing a payment card to the accountholder to enable said purchase transaction to be initiated with said payment account via said payment card.

18. The method as set forth in claim 12 wherein said payment account comprises a debit account.

19. The method as set forth in claim 12 wherein said payment account comprises a credit account.

20. The method as set forth in claim 12 wherein said mobile provider comprises a provider of mobile wireless services.

* * * * *